Nov. 20, 1923. 1,475,046
J. BOLEI
HOOK
Filed Oct. 23, 1922
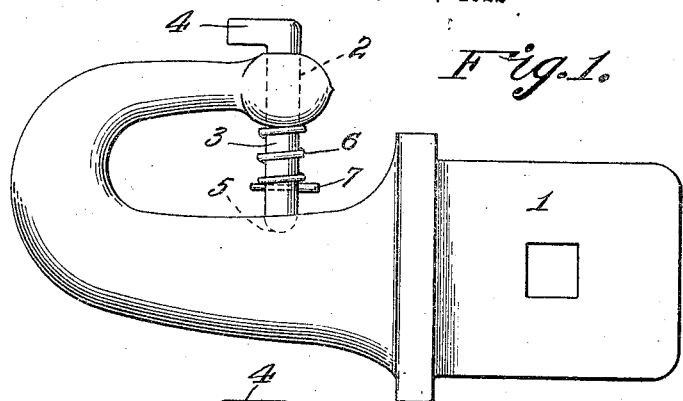
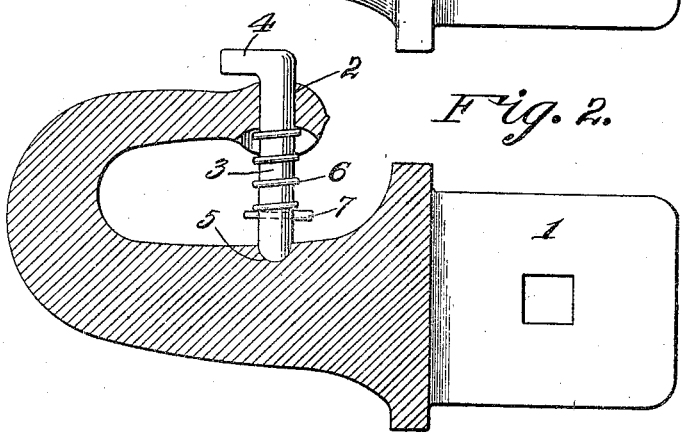
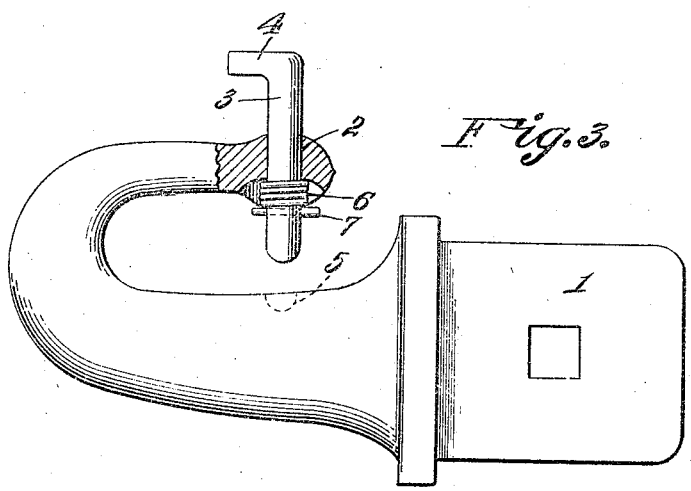
Jesse Bolei
INVENTOR
WITNESS:
ATTORNEY Patented Nov. 20, 1923.

1,475,046

UNITED STATES PATENT OFFICE.

JESSE BOLEI, OF STOCKTON, ILLINOIS.

HOOK.

Application filed October 23, 1922. Serial No. 596,353.

*To all whom it may concern:*

Be it known that I, JESSE BOLEI, a citizen of the United States, residing at Stockton, in the county of Jo Daviess and State of Illinois, have invented new and useful Improvements in Hooks, of which the following is a specification.

This invention relates to a hook which is mainly designed to connect the harrow sections or drag sections to the harrow evener.

Another object of the invention is to provide means whereby the hook can be easily and quickly placed in engagement with the other part whenever desired.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of the improved hook.

Figure 2 is a sectional view.

Figure 3 is a view similar to Figure 2 but showing the pin raised.

In these views 1 indicates the hook which is provided with an opening 2 in the end thereof through which passes a pin 3, said pin being provided with a head 4. A recess 5 is formed in the hook in line with the opening 2 for receiving the end of the pin, the said pin being held in closed position by a spring 6 thereon which engages the end of the hook and a cotter pin 7 passing through a hole in the pin. The spring normally holds the pin with its end in the recess 5, thus closing the hook and preventing a part which is engaged by the hook from being released by the hook. When the part is to be released or placed in the hook it is simply necessary to lift up the pin to permit the part to pass under the end of the same.

As before stated this invention is mainly designed for connecting harrow sections with the evener though it will of course be understood that it may be used for other purposes. Each harrow section is provided with two of the hooks for fastening it to the evener. These hooks will not separate when the harrow is turning as is the case with the hooks now in use.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a hook having an enlarged end which is provided with a recess on its inner side, said enlarged end having a hole therein, the inner end of which communicates with the recess, a pin passing through the hole, the body of the hook having a hole therein in line with the first mentioned hole for receiving the end of the pin, a projection on the pin and a coil spring on the pin having one end engaging the projection and its other end the bottom of the recess for holding the pin with its inner end in the hole in the body of the hook, said spring occupying the recess when the pin is in retracted position.

In testimony whereof I affix my signature.

JESSE BOLEI.